United States Patent
Howard

(10) Patent No.: US 9,358,910 B2
(45) Date of Patent: *Jun. 7, 2016

(54) ACTIVE SUSPENSION OF A MOTOR VEHICLE PASSENGER SEAT

(71) Applicant: Bose Corporation, Framingham, MA (US)

(72) Inventor: Damian Howard, Winchester, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/936,625

(22) Filed: Nov. 9, 2015

(65) Prior Publication Data

US 2016/0059755 A1   Mar. 3, 2016

Related U.S. Application Data

(63) Continuation of application No. 13/927,900, filed on Jun. 26, 2013, now Pat. No. 9,199,563.

(60) Provisional application No. 61/830,936, filed on Jun. 4, 2013.

(51) Int. Cl.
  *B60N 2/50* (2006.01)
  *F16F 15/00* (2006.01)
  *B60N 2/02* (2006.01)

(52) U.S. Cl.
  CPC .............. *B60N 2/501* (2013.01); *B60N 2/0276* (2013.01); *F16F 15/00* (2013.01)

(58) Field of Classification Search
  CPC ........ B60N 2/501; B60N 2/0276; F16F 15/00

USPC ............................................................ 701/45
See application file for complete search history.

(56) References Cited

U.S. PATENT DOCUMENTS

| 2006/0253240 | A1* | 11/2006 | Rao et al. | 701/48 |
| 2011/0035118 | A1* | 2/2011 | Hiemenz et al. | 701/45 |
| 2013/0325323 | A1* | 12/2013 | Breed | 701/420 |
| 2014/0097957 | A1* | 4/2014 | Breed et al. | 340/576 |

* cited by examiner

*Primary Examiner* — Richard Camby
(74) *Attorney, Agent, or Firm* — Brian M. Dingman; Dingman IP Law, PC

(57) ABSTRACT

A method for controlling the operation of an active suspension system for a motor vehicle passenger seat, where the active suspension system comprises an actuator that is constructed and arranged to place force on the seat in a first degree of freedom and a control system that is responsive to a sensor system that detects motor vehicle accelerations in at least the first degree of freedom, where the sensor system comprises an accident detection system that detects motor vehicle accident conditions, where the control system provides control signals that cause the actuator to exert a force on the seat in the first degree of freedom, wherein in normal active suspension operation mode the actuator is controlled to output forces that reduce acceleration of the seat so as to counteract motions of the seat in the first degree of freedom. In response to the detection of an accident condition, the control system is used to operate the actuator in a crash performance mode where the actuator is controlled to output a force that is proportional to the velocity of the seat in the first degree of freedom.

14 Claims, 9 Drawing Sheets

ACTIVE SUSPENSION OF A MOTOR VEHICLE PASSENGER SEAT

CROSS-REFERENCE TO RELATED APPLICATIONS

This application claims priority of application Ser. No. 13/927,900, filed on Jun. 26, 2013, which itself claimed priority of Provisional Patent Application Ser. No. 61/830,936 filed on Jun. 4, 2013.

FIELD

This disclosure relates to the active suspension of a seat of a motor vehicle.

BACKGROUND

Active suspension can be used to counteract unwanted motions of the seat of a motor vehicle; most times the seat that is controlled is the driver's seat but active suspension can be used for any passenger seat. Drivers can experience significant fatigue due to constant seat vibration. Other motions of the seat can also be uncomfortable, or even dangerous. Fatigue and seat-motion related issues can be lessened by using active suspension to reduce seat vibration and other unwanted motions of the seat.

SUMMARY

An active suspension system can be used to counteract unwanted motions of a motor vehicle seat and an occupant sitting in the seat during an unusual event such as a collision or rollover. An active suspension system uses one or more actuators that provide an output motion to help accomplish desired seat suspension and seat movement results. Examples of such actuators include electromagnetic actuators, such as linear motors and rotary motors that drive a transmission mechanism that converts rotary motion to linear motion, hydraulic actuators and pneumatic actuators. The subject active suspension system has an actuator that is constructed and arranged to place force on the seat in a first degree of freedom, and a sensor system that detects motor vehicle accelerations in at least the first degree of freedom. An actuator control system that is responsive to the sensor system provides control signals that cause the actuator to exert a force on the seat in the first degree of freedom so as to counteract unwanted motions of the seat. The sensor system is used to detect the motor vehicle experiencing conditions consistent with a vehicle having an accident, such as acceleration in a second degree of freedom that is different than the first degree of freedom. In response to this, the actuator control system alters controller behavior and/or provides control signals that cause the actuator to exert a force on the seat in the first degree of freedom.

All examples and features mentioned below can be combined in any technically possible way.

In one aspect, a method for controlling the operation of an active suspension system for a motor vehicle passenger seat, where the active suspension system comprises an actuator that is constructed and arranged to place force on the seat in a first degree of freedom and a control system that is responsive to a sensor system that detects motor vehicle accelerations in at least the first degree of freedom, where the sensor system comprises an accident detection system that detects motor vehicle accident conditions, where the control system provides control signals that cause the actuator to exert a force on the seat in the first degree of freedom, wherein in normal active suspension operation mode the actuator is controlled to output forces that reduce acceleration of the seat so as to counteract motions of the seat in the first degree of freedom includes, in response to the detection of an accident condition, using the control system to operate the actuator in a crash performance mode where the actuator is controlled to output a force that is proportional to the velocity of the seat in the first degree of freedom.

Embodiments may include one of the following features, or any combination thereof An accident condition indicative of a front-end collision may be detected based on the detection of a deceleration greater than a predetermined threshold along the forward direction of travel of the motor vehicle, and in response the actuator may be controlled to exert an upward force on the seat. The actuator may be electrically operated, and the control system may interrupt the power to the actuator a predetermined time after the detection of an accident condition. The actuator may be an electromagnetic motor with power input leads, and after the predetermined time the actuator may be operated in an unpowered failsafe mode where the leads are shorted.

Additional embodiments may include one of the following features, or any combination thereof. The active suspension system may further comprise a damper with a variable damping coefficient, where the damper is constructed and arranged to apply a variable resistive force that opposes relative motion of the seating surface of the seat with respect to the seat base, wherein in the normal active suspension operation mode the damper is controlled to have a relatively low damping coefficient, and wherein in crash performance mode the damper is controlled to have a greater damping coefficient. In the crash performance mode the damper may be controlled to have a greater damping coefficient only if a downward velocity of the seat exceeds a threshold velocity. The method may further comprise detecting, based on the sensor system, a rollover of the motor vehicle and in response to the detection of a rollover using the control system to provide control signals that cause the actuator to exert a downward force on the seat. The actuator may be an electromagnetic motor with power input leads, and the method may further comprise in response to the detection of a rollover using the control system to interrupt the power to the actuator and short the leads a predetermined time after the detection of the rollover. The method may further comprise detecting, based on the sensor system, an imminent accident and in response to the detection of an imminent accident using the control system to provide control signals that cause the actuator to exert an upward force on the seat.

Additional embodiments may include one of the following features, or any combination thereof. The seat may be located above the floor of the motor vehicle cabin and the actuator may be coupled to the seat, and the active suspension system may further comprise a spring with a variable spring constant, where the spring is also coupled to the seat. The method may further comprise detecting, based on the sensor system, a rollover of the motor vehicle and in response to the detection of a rollover using the control system to provide control signals that cause the actuator to exert a downward force on the seat and cause the spring constant to quickly decrease, such control signals provided before the actuator is controlled to output a force that is proportional to the velocity of the seat in the first degree of freedom. The spring may comprise an expandable and contractible air container, and causing the spring constant to quickly decrease may comprise causing air to be expelled from the air container. The active suspension system may further comprise a damper with a variable damping coefficient, where the damper is constructed and arranged to a apply a variable resistive force that opposes relative motion of the seating surface of the seat with respect to the seat base, wherein in the normal active suspension operation mode the damper is controlled to have a relatively low damping coefficient, and the method may further comprise in response to the detection of a rollover using the control system to cause the damping coefficient of the damper to remain relatively low. The seat may have a lowest controlled position and in response to the detection of a rollover, when the seat reaches its lowest controlled position the control system may be used to increase the damping coefficient of the damper.

Additional embodiments may include one of the following features, or any combination thereof. The active suspension system may comprise at least first and second actuators, where the first actuator is constructed and arranged to place force on the seat in a first degree of freedom of the seat and the second actuator is constructed and arranged to place force on the seat in a second degree of freedom of the seat that is different from the first degree of freedom, the method further comprising: in response to the detection of an accident condition, using the control system to operate the actuators in a crash performance mode where the first actuator is controlled to output a force in the first degree of freedom and the second actuator is controlled to output a force in the second degree of freedom. The sensor system may comprise an inertial sensor that senses motions of the seat and a non-inertial sensor that senses motions of the seat, wherein in the normal active suspension operation mode the control system is responsive to both the inertial and non-inertial sensors, and wherein in response to the detection of an accident condition the control system becomes responsive only to the non-inertial sensor, and is not responsive to the inertial sensor. The sensor system may comprise at least one sensor that is part of the motor vehicle and is not part of the active suspension system, where the sensor is constructed and arranged to transmit sensor signals to the control system, and wherein the control system is adapted to receive the sensor signals and in response generate control signals that cause the actuator to exert forces on the seat. In a truck with a cab that includes the passenger seat, and a separate trailer that is coupled to the cab, the sensor system may comprise one or more sensors that detect one or more of: motion of the cab, motion of the trailer, relative motion between the trailer and the cab, and relative forces between the trailer and the cab. The method may further comprise detecting, based on the one or more sensors that detect motion of the cab, or relative motion or forces between the trailer and the cab, a rolling motion of the trailer that is greater than a threshold rolling motion, indicative of a potential rollover of the motor vehicle.

In another aspect, a method for controlling the operation of an active suspension system for a motor vehicle passenger seat, where the active suspension system comprises: a first actuator that is constructed and arranged to place force on the seat in a first translational degree of freedom that is generally vertical with respect to the earth; a second actuator that is constructed and arranged to place force on the seat in a second translational degree of freedom that is different than the first degree of freedom and is generally horizontal with respect to the earth and transverse to the forward direction of travel of the motor vehicle; and a control system that is responsive to a sensor system that detects motor vehicle accelerations in at least the first and second degrees of freedom and that comprises an accident detection system that detects motor vehicle accident conditions, where the control system provides control signals that cause the actuators to exert forces on the seat in the first and second degrees of freedom, wherein in normal active suspension operation mode the first actuator is controlled to output forces that reduce accelerations of the seat, may include, in response to the accident detector detecting a rollover or impact accident condition, using the actuator control system to operate the actuators in a crash performance mode where the first actuator is controlled to output a force in the first degree of freedom and the second actuator is controlled to output a force in the second degree of freedom and in a direction along the second degree of freedom that is away from the side onto which the vehicle is rolling or the side that was impacted.

In another aspect, a method for controlling the operation of an active suspension system for a motor vehicle passenger seat, where the active suspension system comprises an actuator that is constructed and arranged to place force on the seat in a first degree of freedom and a control system that is responsive to a sensor system that detects motor vehicle accelerations in at least the first degree of freedom and that comprises an accident detection system that detects motor vehicle accident conditions, where the sensor system comprises an inertial sensor that senses motions of the seat and a non-inertial sensor that senses motions of the seat, and where the control system provides control signals that cause the actuator to exert a force on the seat in the first degree of freedom, wherein in normal active suspension operation mode the actuator is controlled to output forces that reduce accelerations of the seat, may include wherein in the normal active suspension operation mode the control system is responsive to both the inertial and non-inertial sensors, and in response to the detection of an accident condition, the control system becomes responsive only to the non-inertial sensor, and is not responsive to the inertial sensor.

In another aspect, a method for controlling the operation of an active suspension system for a motor vehicle passenger seat, where the active suspension system comprises an actuator that is constructed and arranged to place force on the seat in a first degree of freedom and a control system that is responsive to a sensor system that detects motor vehicle accelerations in at least the first degree of freedom and that comprises a system that detects one or more of a motor vehicle accident and an imminent accident, wherein the sensor system comprises at least one sensor that is part of the active suspension system, where the sensor is constructed and arranged to transmit sensor signals to the control system, and where the control system provides control signals that cause the actuator to exert a force on the seat in the first degree of freedom, wherein in normal active suspension operation mode the actuator is controlled to output forces that reduce accelerations of the seat, and where the motor vehicle has a vehicle data network that communicatively interconnects the active suspension system with a different motor vehicle system, may include in response to the detection of an accident or an imminent accident, using the control system to operate the actuator to place force on the seat in the first degree of freedom and communicating over the network to the different motor vehicle system a signal that is related to the accident or imminent accident.

In another aspect, a method for controlling the operation of an active suspension system for a motor vehicle passenger seat, where the active suspension system comprises an actuator that is constructed and arranged to place force on the seat in a first degree of freedom, a damper with a variable damping coefficient, where the damper is constructed and arranged to a apply a variable resistive force that opposes relative motion of the seating surface of the seat with respect to the seat base, and a spring with a variable spring constant, where the spring is constructed and arranged to place force on the seat in the first degree of freedom, and a control system that is responsive to a sensor system that detects motor vehicle accelerations in at least the first degree of freedom, where the sensor system comprises an accident detection system that detects motor vehicle accident conditions, where the control system provides control signals that cause the actuator to exert a force on the seat in the first degree of freedom, wherein in normal active suspension operation mode the actuator is controlled to output forces that reduce acceleration of the seat so as to counteract motions of the seat in the first degree of freedom, may include detecting, based on the sensor system, a rollover of the motor vehicle and in response to the detection of a rollover using the control system to provide control signals that cause the actuator to exert a maximum downward force on the seat, cause the spring constant of the spring to quickly decrease, and cause the damping coefficient of the damper to be relatively low. In response to the detection of a rollover, after the seat is pulled down by the actuator the control system may be used to operate the actuator to output a force that is proportional to the velocity of the seat in the first degree of freedom.

DETAILED DESCRIPTION

An active suspension system for a motor vehicle passenger seat (which is sometimes termed herein an "active seat") can be designed and operated so as to inhibit downward motion of the seat during a front-end collision. More generally, during an accident the actuator of the active suspension system can be controlled to output a force that is proportional to the velocity of the seat. The active suspension system can also be designed and operated so as to quickly pull the seat down toward the floor during a rollover; as the rollover proceeds that seat can be moved in more than one degree of freedom in ways that counteract the seat motions caused by the rollover. The active seat can communicate with existing vehicle systems over the existing vehicle data communication network.

Embodiments of the systems and methods described here comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

Figure 1:
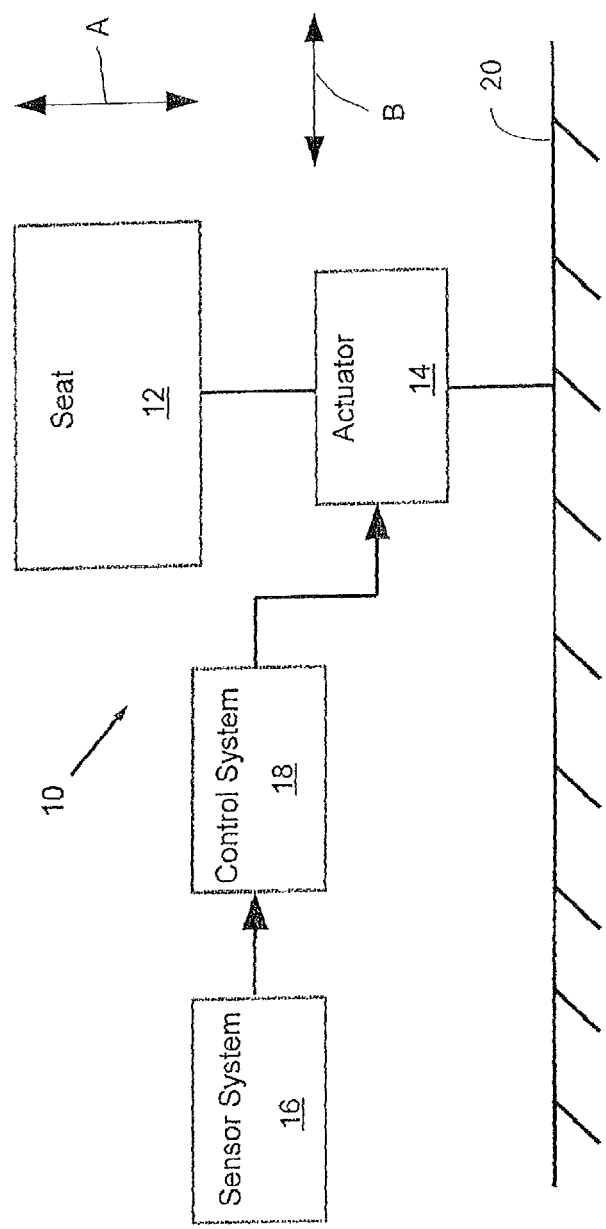
FIG. 1 is a block diagram of an active suspension system for a motor vehicle passenger seat.

Active suspension system 10, FIG. 1, uses actuator 14 to place forces on motor vehicle seat 12. Actuator 14 is coupled (either directly or indirectly) to both seat 12 and another portion of the motor vehicle, which in this non-limiting example is the cabin floor 20. Actuator 14 in this example applies forces linearly along first degree of freedom "A," which here is vertically up and down. This can move (translate) the seat up and down. Actuator 14 may be an electromagnetic actuator, for example a linear motor or a rotary actuator with a rotary to linear motion transmission, as is known in the art. Actuator 14 can alternatively be hydraulically or pneumatically actuated.

System 10 in its typical operation uses sensor system 16 to sense accelerations of a location of the motor vehicle in this same first degree of freedom; this location is commonly the seat, the vehicle frame or the vehicle body. Control system 18 interprets the sensed accelerations and initiates control signals that are provided to actuator 14 to counteract seat motion caused by the sensed accelerations. One example of accelerations is vibrations and jolts caused by operation and motion of the motor vehicle while driving along a road. The result of such active seat suspension is to reduce accelerations of the seat, which will decrease vertical motions of the seat caused by such vibrations and jolts.

Sensor system 16 can also sense a quantity related to motion such as accelerations (or other quantities representative of vehicle motion such as velocity in any direction, roll angle, roll rate, pitch angle, pitch rate, etc.) of the motor vehicle in second degree of freedom "B," which is different that the first degree of freedom. In one example this second degree of freedom is horizontal translation, e.g., accelerations and decelerations in the direction of travel of the motor vehicle. However, this second degree of freedom could be any one or more of the other of the remaining five of the six degrees of freedom of the motor vehicle. In response to motions or accelerations sensed in degree of freedom B, control system 18 alters controller behavior as will be described later, and/or provides control signals to actuator 14 to cause the actuator to exert forces on seat 12 in first degree of freedom A. Typically these forces are meant to accomplish a particular desired resultant motion of the seat and/or the occupant of the seat.

An accident detection system may detect accident conditions by sensing accelerations and/or other motions such as rotations and/or angle, in one or more degrees of freedom, as accomplished by sensor system 16 described above. Alternatively, an accident detection system can determine if accident conditions are present or are imminent using other means. In one example, an accident detection system uses optical, electromagnetic (i.e. radar), or other sensing means to determine if the vehicle in which the active seat resides is about to collide with another vehicle. The controller can change its behavior and/or the controller can issue control commands to the actuator to output a force in response to the determination that an accident condition is either probable or imminent. The accident detection system may be incorporated as part of the active seat system, or it may be incorporated in some other part of the vehicle. In the case where the accident detection system is not incorporated in the active seat, the accident detection system is in communication with the active seat and informs the active seat controller when an accident is either probable or imminent, or when an accident is occurring.

Figure 2:
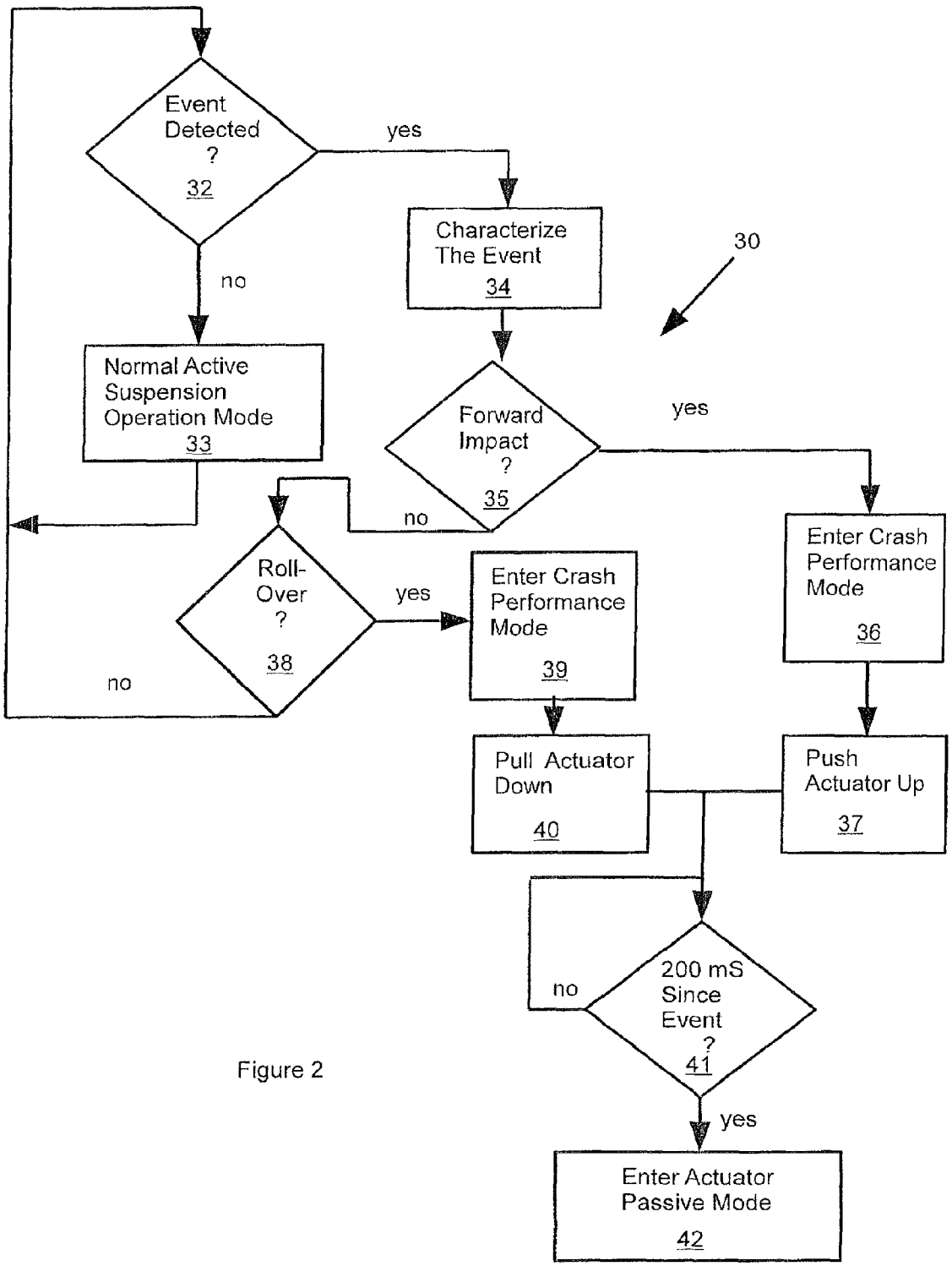
FIG. 2 is a flow chart illustrating an operation of an active suspension system for a motor vehicle passenger seat.

One use of system 10 is to counteract the effects of an event that can lead to possible injury of an occupant of the vehicle, such as a head-on collision, a partial front-end collision, a side collision, a direct or partial rear-end collision, or a rollover. For example, a collision can be determined based on sensor system 16 detecting the axis (or axes) and magnitudes of accelerations in one or more of the six degrees of freedom of the motor vehicle. Flow chart 30, FIG. 2, illustrates one of many possible manners in which system 10 can be operated in forward impact (i.e., front end collision) and rollover situations. Sensor system 16 is continually monitored for unusual accelerations (events) in one or more degrees of freedom, step 32. If no event is detected normal operation of the active suspension termed "normal active suspension mode", where the suspension is used to counteract vibrations arising from normal operation of the vehicle, is maintained, step 33. For example, in normal operation, the controller implements a negative feedback loop around acceleration of the seat top in order to minimize acceleration of the seat top.

As a non-limiting example of the detection of an event, an acceleration in any degree of freedom that is greater than a predetermined maximum normal acceleration can be determined to be an "event", step 32. As most vehicles will not normally experience an acceleration approaching 30 m/s/s (3 g), the event threshold can be set to 3 g (although other thresholds could be set if desired). At step 34 the event is characterized based on the sensed accelerations and their degrees of freedom. For example, a forward impact could be determined if a forward deceleration of at least 3 g is sensed, step 35, and a rollover can be determined if the vehicle has rolled more than, say, 45° (i.e., the detected roll angle is greater than 45°, step 38. If a forward impact is detected, "crash performance mode" is entered, step 36, and the controller behavior is altered and/or the actuator is commanded to output a force, step 37. For example, the controller may switch behavior from implementing a negative feedback loop around acceleration of the seat to implementing a negative feedback loop around relative velocity of the seat top with respect to the vehicle floor. If the seat begins to move down in a forward impact, the result can be that the actuator is commanded to push the seat up. If a rollover is detected "crash performance mode" is entered, step 39, and the actuator is commanded to output a force to pull the seat down, step 40. The "crash performance mode" can be set to expire a predetermined time after the event was detected; in one case the time is 200 milliseconds (mS) and is determined at step 41. After this time the system enters the actuator passive mode, step 42, where current to the actuator is limited to a smaller value than normal operating mode or to zero, thus de-energizing the motor. Additionally, in actuator passive mode the actuator coil power input leads may be clamped to short circuit the coils, causing the actuator to act like a passive mechanical damper. Some of these actions are further described below.

Some motor vehicle seat active suspension systems, such as the Ride® system available from Bose Corporation of Framingham, Mass. USA, use a four-bar seat suspension base linkage between the floor of the cabin and the seat support that supports the seat on which the passenger sits. The linkage supports the seat and allows it to be moved vertically by the actuator(s). When a vehicle with this system experiences a front-end collision and the person in the seat is constrained by a seatbelt which is anchored to the Bose Ride interconnection point (ICP) and to the floor just behind the seat, the momentum of the seat and the person causes the person's upper body to pivot forward and down about the hips. This causes the linkage to compress and thus causes the seat to move down. One result is that the occupant's head moves forward and down, thus moving the head closer to the steering wheel, the dash and deploying vehicle airbags. Such excursions of the head beyond its normal position may lead to serious head trauma.

In an exemplary active suspension system 10, actuator 14 comprises a linear motor with a maximum output force of 1000 Newtons (N). In a front end collision where the seat and the occupant have a mass of 100 Kg and the maximum deceleration is 22 g, the horizontal motion couples through a 7.5 degree four-bar link to yield approximately 3000N of downward force. This can cause a downward seat velocity of about 2 meters per second (m/S). The actuator 14 may have a vertical full stroke of about 100 mm, around nominal mid-height adjustment before it physically bottoms out. Since the seat is coupled to the actuator, during a front-end collision the front of the seat may collapse 50 mm, if the actuator was at nominal mid-height adjustment pre-crash.

In "normal active suspension operation mode", the Bose Ride® system has a failsafe operating mode where the active system is switched into operation in the passive actuator mode whenever a fault is detected. One example of a fault condition would be saturation or failure of a sensor, which could happen for a number of reasons. In failsafe operating mode, the system remains in passive mode until the fault is corrected. Once the fault is no longer present, the system reverts back to normal active suspension operation mode. When an accident occurs, it is highly likely that the system accelerometers will saturate or have erroneous output. The output signals from inertial measurement devices such as accelerometers cannot be trusted when high acceleration or high deceleration events such as a crash event occur. If the system were to switch into failsafe operation, the actuator would operate in its passive, clamped state as a mechanical damper. In this state, the maximum damping force provided by the actuator will be less than the available maximum force if the actuator were operated in an active state. In passive clamped state, the damping coefficient of the actuator is fixed by the actuator design.

In the event of a crash, an actuator operated in a passive state is less able to resist the crash forces than if it were allowed to operate in an active state. If the actuator were allowed to remain active when a crash is detected, it could, for example, be controlled to operate as a physical damper where the damping coefficient could be set arbitrarily, and could be as high as is physically possible given the maximum output force capability of the actuator. In one non limiting example, in a crash the controller behavior is altered such that it implements a negative feedback loop around the relative velocity of the seat top with respect to the vehicle floor. In this mode, the controller makes the system look like a physical damper where the damping coefficient is controlled in order to minimize the relative velocity of the seat top relative to the vehicle floor.

Figure 3:
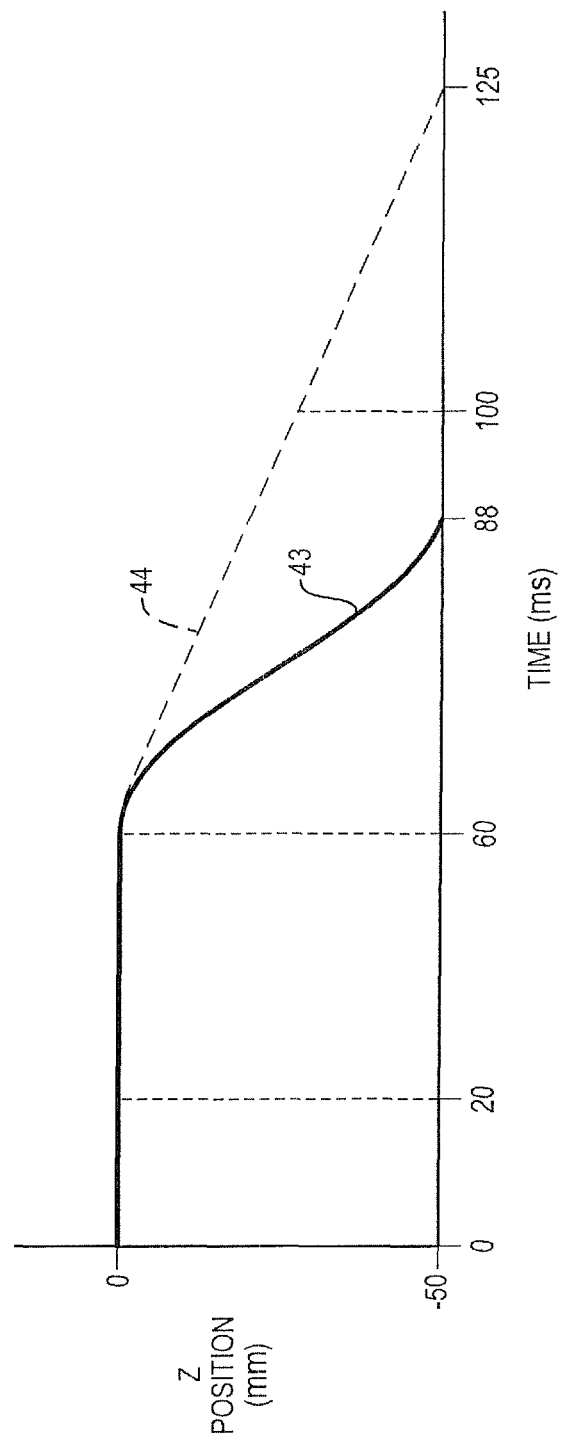
FIG. 3 illustrates an example of the vertical (z) position of a seat over time during a front-end collision.

The motor can be operated to slow the seat downward motion by allowing the active suspension system to remain active such that the motor can output up to its full 1000N of force upon the detection of an event or crash such as a forward impact. The graph of FIG. 3 illustrates this benefit. Vertical seat movement (z position) is plotted on the y axis with time in milliseconds (mS) on the x axis. Nominal operational vertical seat position is at 0 mm in the z position. The event begins at 0 mS. The event is detected by the control system at 20 mS. At about 60 mS the seat begins to move downward at high velocity. If the system were to operate in the failsafe mode with the actuator leads clamped, the motor force output would be restricted to what can be generated by the motor back EMF which has a maximum force of approximately 400N. In this condition, the seat motion would follow plot 43 (solid line) and would bottom out (−50 mm z position) at about 85-90 mS. When the motor is controlled to have full force output of 1000N available, for example when in "crash performance mode" where the controller implements a negative feedback loop around the relative velocity of the seat top with respect to the vehicle floor, the seat motion will follow plot 44 (dashed line) and bottom out at about 125 mS. Also, note that at 100 mS there is significantly less vertical displacement (50 mm versus 22 mm, thus a reduction of about 28 mm).

Figure 4:
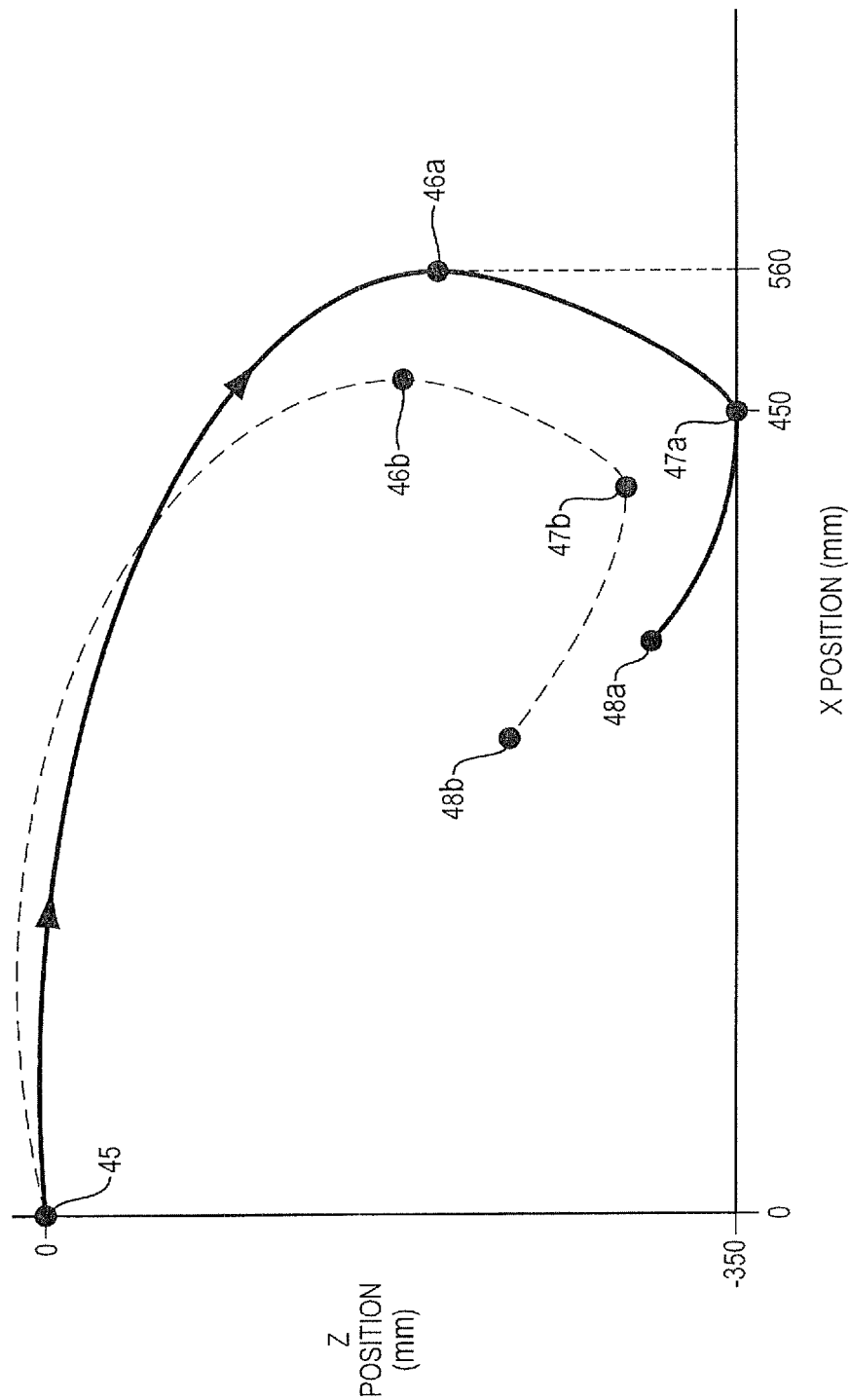
FIG. 4 is a plot of the x-z position of the head of the occupant of a seat during a front-end collision.

The graph of FIG. 4 illustrates the occupant's head movement in the vertical (z) and horizontal (x) directions through time during the previously described front end collision. The motion that moves from the pre-crash position 45, through points 46a, 47a and ending at 48a (plotted as a solid line) is based on the system 10 while operating in "normal active suspension operation mode", where upon detection of a fault condition (such as accelerometer saturation as may occur in a crash, or upon detection of a crash event by a crash event detection system), the actuator is operated in passive, clamped mode. The maximum forward (x) excursion of the forehead is noted by the right-most point 46a, which is forward about 560 mm from the pre-crash position 45 and occurs at about 80-90 mS post-crash. The maximum vertical (z) excursion of the head is about −350 mm (downward) at point 47a from the pre-crash position 45 and occurs at about 120 mS post-crash. Since the maximum forward excursion of the head occurs in under 100 mS, it would be beneficial to slow the time when the seat bottoms out until after 100 mS post-crash. One result would be that the seat would bottom out after the head had begun to retract away from its forward-most point, toward end point 48a.

The motion that moves from the pre-crash position 45, through points 46b, 47b and ending at 48b (plotted as a dashed line) is based on the system 10 while operating in "crash performance mode", where the controller has been altered to implement a negative feedback loop around the relative velocity of the seat top with respect to the vehicle floor, and the actuator has remained active. The maximum forward (x) excursion of the forehead is noted by the right-most point 46b, which is less than point 46a. The maximum vertical (z) excursion of the head is noted by 47b which is less than 47a. The ending point 48b exhibits less vertical displacement and horizontal displacement as compared to 48a. One result of this difference in motion is that the chances of impact with the dash or with a deploying airbag are reduced.

Figure 5:
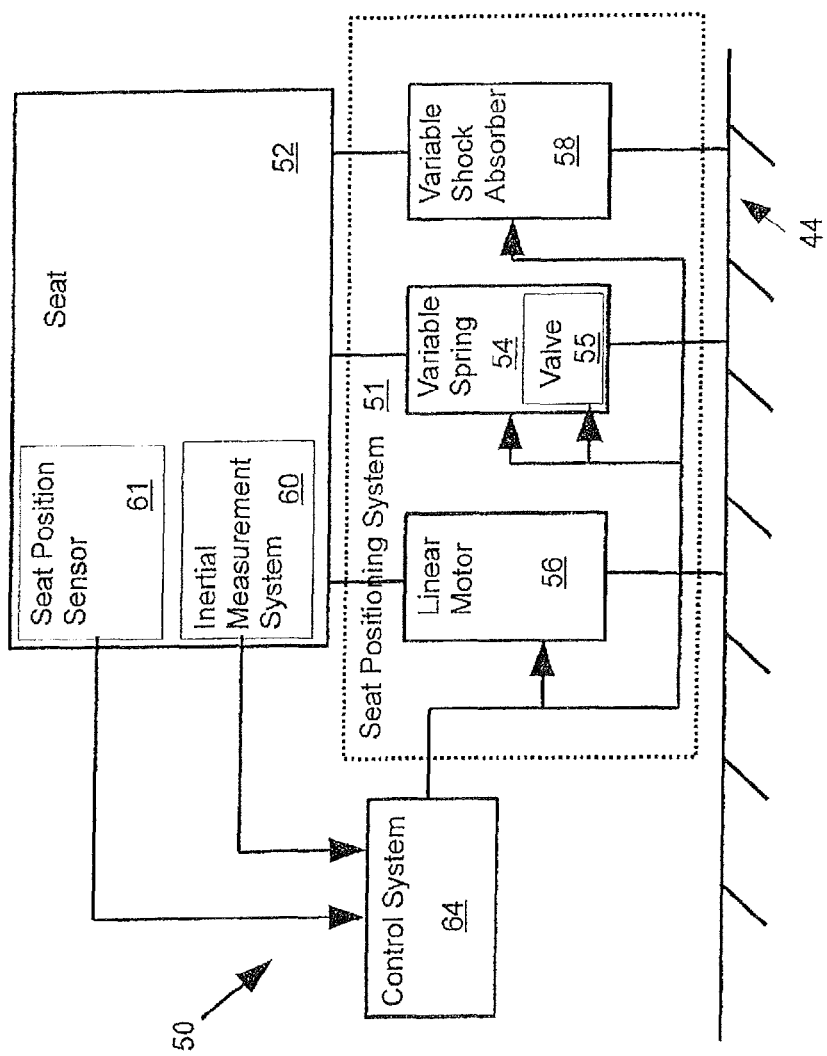
FIG. 5 is a block diagram of an active suspension system for a motor vehicle passenger seat.

One example of an active suspension system 50 for a motor vehicle passenger seat 52 is shown in FIG. 5. System 50 includes seat positioning system 51 which has two separate actuators and a variable damping coefficient damper such as a variable force shock absorber. Variable spring 54 has a variable spring constant. In one non-limiting example spring 54 is an air cylinder or another type of pneumatic or hydraulic system with variable force output, and is commonly used as a force bias eliminator. Spring 54 acts as a load-leveling system whose goal is to reduce the average force that the actuator (linear motor) needs to output to control motion of the seat in the intended degree of freedom during normal operation to zero. Control to reduce the average force to zero involves both adding air and removing air from the air cylinder. As explained below, pneumatic cylinder 54 can include an electrically-operated valve 55 that can be opened to quickly expel air from the cylinder in a crash event. The second actuator is linear motor 56, which acts to place vertical forces on seat 52 to push or pull the seat in opposition to sensed vertical accelerations. Shock absorber 58 is a damper with a variable damping coefficient. Shock absorber 58 is mounted in parallel with the actuators and is used to apply additional damping or resistive force on the seat as needed to damp seat motion, as further explained below.

An active suspension system can be designed to counteract and/or damp motions in any one or more of the six degrees of freedom of the vehicle seat. There is typically at least one active actuator or a passive suspension for each degree of freedom of concern. For example, a system can actively control in the vertical axis and have passive suspension systems in the X and Y axes of the horizontal plane of the seat. Or, the system may have active control in the vertical (z) axis and the horizontal (y) lateral axis which is perpendicular to the direction of travel (x axis) of the motor vehicle. Typical passive suspensions are combinations of springs and dampers. Resonant absorbers can also add damping masses.

When a vehicle is involved in a front-end collision there is a sudden horizontal deceleration. As described above, in an active seat system with at least vertical axis active control such as shown in FIG. 5 the deceleration causes forward/downward pivoting motion of the torso and head that can be exacerbated by the reaction of spring 54. Since spring 54 is relatively soft in comparison to the downward forces on the seat in a front-end collision, the spring can compress. Due to the forward dynamics of a front-end collision, the mechanical structure under the seat top will tend to tilt forward. The seatbelt tethers connected between the ICP and the floor prevents the rear of the seat system from moving beyond a certain point. The front of the seat system is not limited by any means vertically and will dip down. The result is that the seat top and occupant will be thrown forward and downward. The result can be an extreme forward excursion of the head.

System 50 can be arranged to counteract these excursions by using linear motor 56 to exert an upward force on seat 52 upon the detection of a front-end collision. This force can help to maintain seat 52 closer to its pre-crash vertical position than would be the case without the application of such upward force. This force can also help to maintain seat 52 in a more horizontal position; i.e., it can inhibit or at least slow the pivoting of the seat relative to the cabin floor. Either or both of these results of upward vertical force on the seat will help to decrease the forward motion of the torso and head, which can ameliorate injuries caused by the collision.

Active suspension system 50 includes inertial measurement system 60 that is coupled to seat 52 so as to sense accelerations and/or rotations of the seat along and/or about one, two or three orthogonal axes in space. Thus system 60 acts as inertial sensor in from one to six degrees of freedom of the seat. Its output is provided to control system 64. Seat position sensor 61 is not an inertial measurement instrument. Seat position sensor 61 may employ magnetic sensors on the stator and armature of a linear motor actuator as described in U.S. Pat. No. 7,932,684 which is incorporated herein by reference. Since sensor 61 is not inertial it does not become unreliable in a crash as inertial sensors might. In crash performance mode the controller thus may rely solely on sensor 61 and ignore sensor system 60. Control system 64 interprets the outputs from one or both of inertial measurement system 60 and seat position sensor 61 and creates control signals that cause linear motor 56 and/or spring 54 and/or shock absorber 58 to act accordingly. These actions can include placing force(s) and/or damping motions on the seat in any one or more of its six degrees of freedom (presuming that the appropriate actuators and dampers are in place so as to accomplish the forces and damping). One aim of such actions can be to position the occupant in the case of an unusual event such as an impact or rollover, so that impacts of the occupant with the motor vehicle interior are less likely to occur, or their severity is lessened.

Figure 6A:
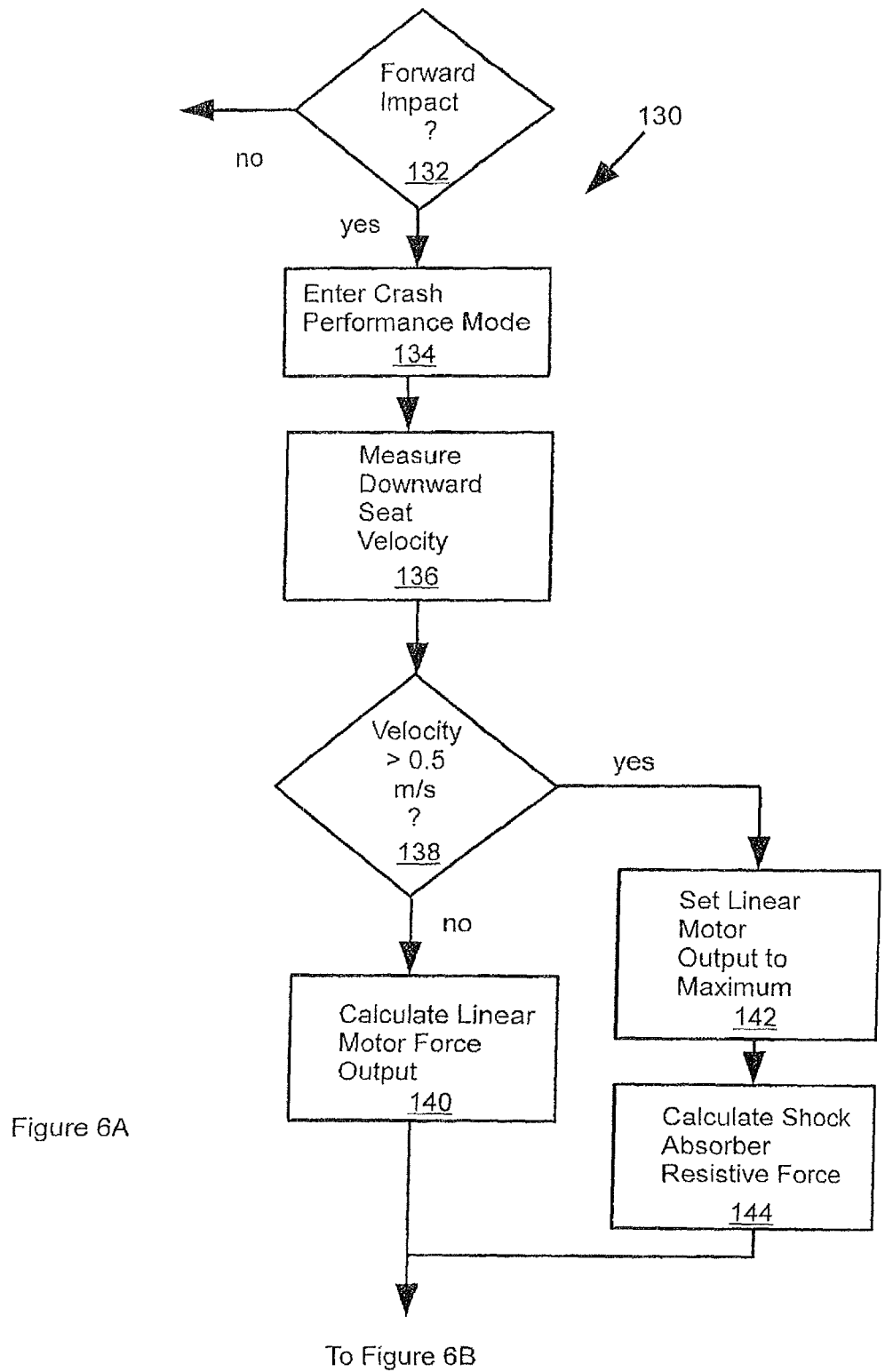
FIGS. 6A and 6B together are a flow chart illustrating an operation of the active suspension system for a motor vehicle passenger seat of FIG. 5.
Figure 6B:
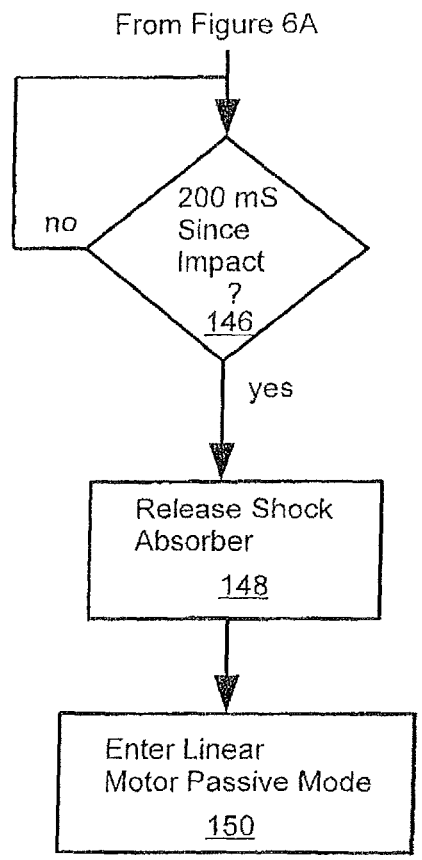

One example of operation of system 50 in the case of a front-end collision is illustrated by flowchart 130, FIGS. 6A and 6B. Upon the detection of a lateral or fore/aft acceleration greater than 3 g (e.g., forward impact 132) the system first enters a "crash performance mode", step 134. While in this mode, the system may command an amount of actuator force that is related to (e.g., proportional to) the downward velocity of the seat and that can be greater than the amount of actuator force that is normally available in the failsafe operation associated with the "normal operating mode," up to the maximum actuator force. The faster that the seat moves downward, the greater the upward force provided by the actuator. The goal is to maintain the pre-crash vertical seat position. In one example, the control system can be operated such that the actuator force is equal to the seat velocity multiplied by a negative constant. This causes the actuator to act as a linear shock absorber that damps downward motion of the seat. In another example the controller implements a negative feedback loop around relative velocity of the seat top with respect to the vehicle floor. In this case, the systems acts like a mechanical damper with a damping coefficient that is varied as needed to minimize the relative velocity. In another example the controller could implement a negative feedback position loop to try to maintain seat top position relative to the vehicle floor. In another example an acceleration signal could be derived from the seat position sensor, in which case operation can continue with an acceleration control loop as described above. In one example, a three-axis accelerometer is mounted to this seat structure and is monitored more than 2000 times per second. From the measured acceleration, velocity and distance can be derived mathematically by the system, step 136. Alternatively, since inertial measurement instruments such as accelerometers can become unstable and unreliable in high-g events such as front-end collisions, the seat velocity can be determined based on the derivative of the output of non-inertial seat position sensor 61. Once the seat velocity has been determined the system can apply an appropriate current to the motor to establish the desired force.

An airbag can have more air pushed into it by opening the solenoids on the air input lines. Truck air is typically 100 pounds per square inch (psi). Pneumatic control systems have slow reactance speeds. If the airbag valves were opened to add air during a crash event, this would not create enough extra force to withstand the downward force due to the event. Thus, spring 54 is not effective to maintain the vertical position of the seat in a crash.

The vertical seat position can be improved by the creation of more significant opposing resistive forces, which would help to prevent the collapsing of the seating system. A mechanical shock absorber with a variable damping coefficient mounted in parallel with the linear motor and the spring can be used to supply the needed additional vertical resistive force. This shock can be designed to not offer any substantial damping (i.e., the damping coefficient is low) during normal operation (which can in one non-limiting example be defined by a vertical seat velocity of no more than about 0.5 m/S). However, while the system is in the crash performance mode and the seat velocity is greater than 0.5 m/S indicative of an abnormal event such as a crash, step 138, the shock's resistive force would be increased (i.e., its damping coefficient would be increased). If while in the crash performance mode the seat velocity is less than 0.5 m/S, the system uses only the active linear motor to oppose downward seat motion; the necessary force is calculated at step 140.

A magneto-rheological (MR) shock is one means of accomplishing the desired force/velocity relationship to damp downward forces of more than about 1000N. As one non-limiting example the damping coefficient of the shock is controlled in normal operation to result in forces in the range of 0 to about 1000N. If a forward impact is detected, step 132, crash performance mode is entered, step 134. If the measured downward seat velocity is greater than 0.5 m/S, step 138, the controller operation is changed, for example to implement a negative feedback loop around the relative velocity of the seat top with respect to the vehicle floor where maximum output force of the actuator remains available, step 142, and the additional resistive force that can be supplied by the linear motor and that is needed to counteract the downward force (to be applied by variable force shock 58) is calculated, step 144. The control system can calculate how much current to apply to the MR shock to obtain a desired output force. For example, if the system was moving downward at 2 m/S, to obtain 2000N of force from the shock, about 2A of current would be necessary. The seat velocity can be determined based on the derivative of the output signal of seat position sensor 61. In one manner of operation of the control system, a control loop on velocity may directly adjust the damping coefficient of shock 58.

The "crash performance mode" can be set to expire a pre-determined time after the accident or event (in this case, a front end collision) was detected; in this case the time is 200 mS and is determined at step 146. After this time the variable force shock is released (i.e., its damping coefficient is set to zero), step 148, and the system then enters the linear motor passive mode, step 150, where current to the motor is limited to a smaller value than normal operating mode or to zero, thus de-energizing the motor, and the motor is clamped. Where the velocity is less than 0.5 m/S and the shock absorber was never engaged, step 148 is bypassed, in which case after 200 mS (step 146) the linear motor is commanded to enter the passive mode, step 150.

Figure 7:
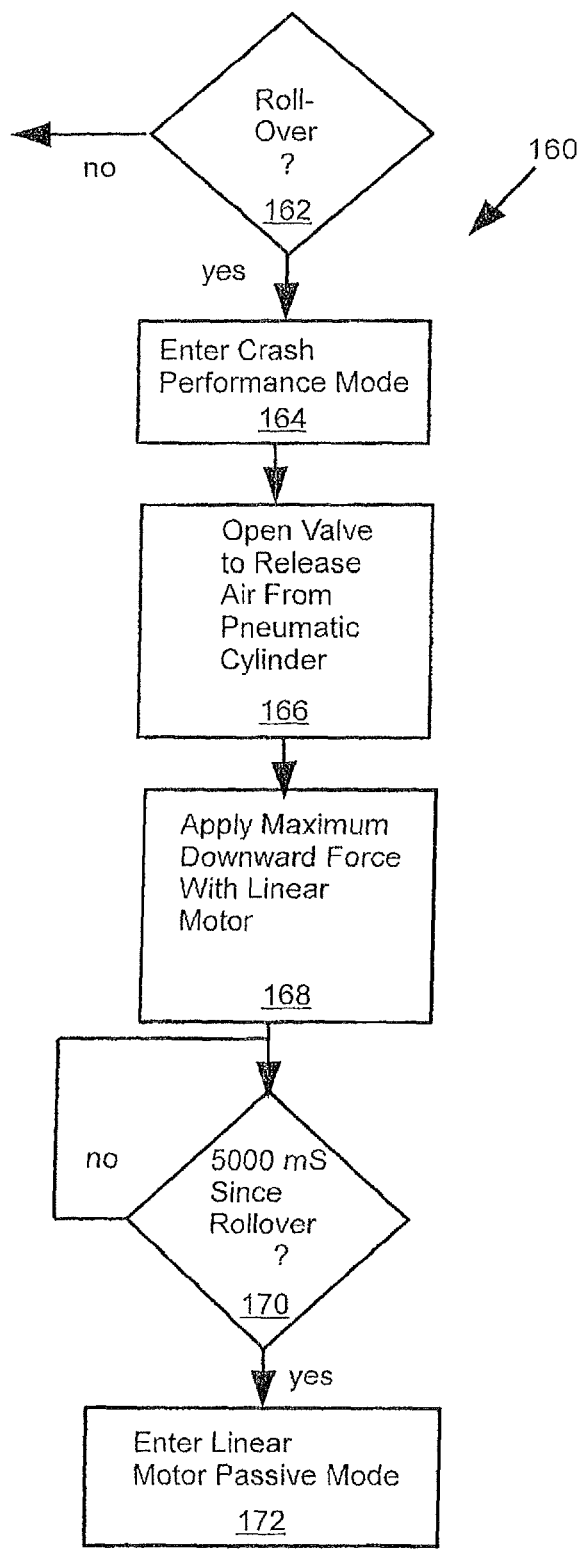
FIG. 7 is a flow chart illustrating an operation of the active suspension system for a motor vehicle passenger seat of FIG. 5.

Flowchart 160, FIG. 7, details an example of the operation of system 50 upon detection of a rollover event, step 162. The system enters crash performance mode, step 164. One goal of system 50 during a rollover is to pull the seat down as quickly as possible to help prevent the occupant from impacting the ceiling of the cabin as the vehicle rolls onto or toward its roof. As variable force spring 54 is holding the seat up, it will inhibit downward movement of the seat. To facilitate the ability of the seat to be moved downward, it is best to quickly decrease the spring constant of the spring, which in this case is done by releasing air from the air cylinder. This is done at step 166 by using control system 64 to open valve 55, which is designed to allow air to be expelled quickly. Then at step 168 the linear motor is commanded to apply maximum downward force. After 5000 mS post-event, step 170, the motor is commanded to enter its passive, clamped mode, step 172. One reason that the linear motor is applied for 5000 mS in a rollover and only 200 mS in a front-end collision is that a rollover tends to occur over a longer period of time than a collision.

A front impact is sensed by reading the acceleration reported for the "X" axis. A movement in the X direction would give a +/− reading up to the scale of the device. In a high-g crash scenario, an inertial measurement device such as an accelerometer will often saturate and be subject to severe cross-axis coupling that makes it an unreliable control system input sensor. However, an accelerometer can act as an accident or crash sensor. For example, with a device that saturates at 3 g, a maximum output (e.g., 3 g) indicates an accident. Multiple samples can be taken to determine this is not an instantaneous loss of signal. Sampling of the accelerometer at 2000 times/sec, means that for a crash pulse of 100 mS, there would be 200 samples. In practicality, 10 consecutive samples would be enough to determine an accident or crash event with some amount of confidence.

Methods to detect roll are well known in the art. In one non-limiting example a three axis X/Y/Z accelerometer mounted to the upper mechanical structure of the seat suspension base can be used as inertial measurement system 60. To this structure the seat top is mounted. The occupant sits on the seat top. The accelerometer is mounted rigidly and directly below the center point of where the occupant sits. The X/Y/Z accelerometer provides a digital value output that is scaled to the acceleration seen by each axis. Math can be used to determine the angle of rotation of the device relative to the "g" seen on each axis. An alternative means of measuring rotation would be to use a gyroscope device (e.g., a MEMS gyro) that can output angle. A typical MEMS accelerometer is the KXRB5-2367, manufactured by Kionix, Inc. A typical MEMS combined gyroscope and accelerometer is the MPU-6500, manufactured by InvenSense, Inc.

A rollover can be sensed by deducing using calculations the angle of rotation as reported by the X/Y/Z accelerometer, or by other methods known in the art. For example, if the accelerometer was rotated in one axis, a reading of less than 1 g would be measurable. Math can be used to map the acceleration in an axis to an angle of rotation. A MEMS gyroscope can provide both a 3 axis gyroscope and 3 axis accelerometer. The determination that a forward impact has occurred can be based on when acceleration of more than 3 g is sustained for a period of samples. The determination that a rollover has occurred can be when a certain angle has been exceeded from an upright vertical position reading, e.g., 45 degrees.

Figure 8:
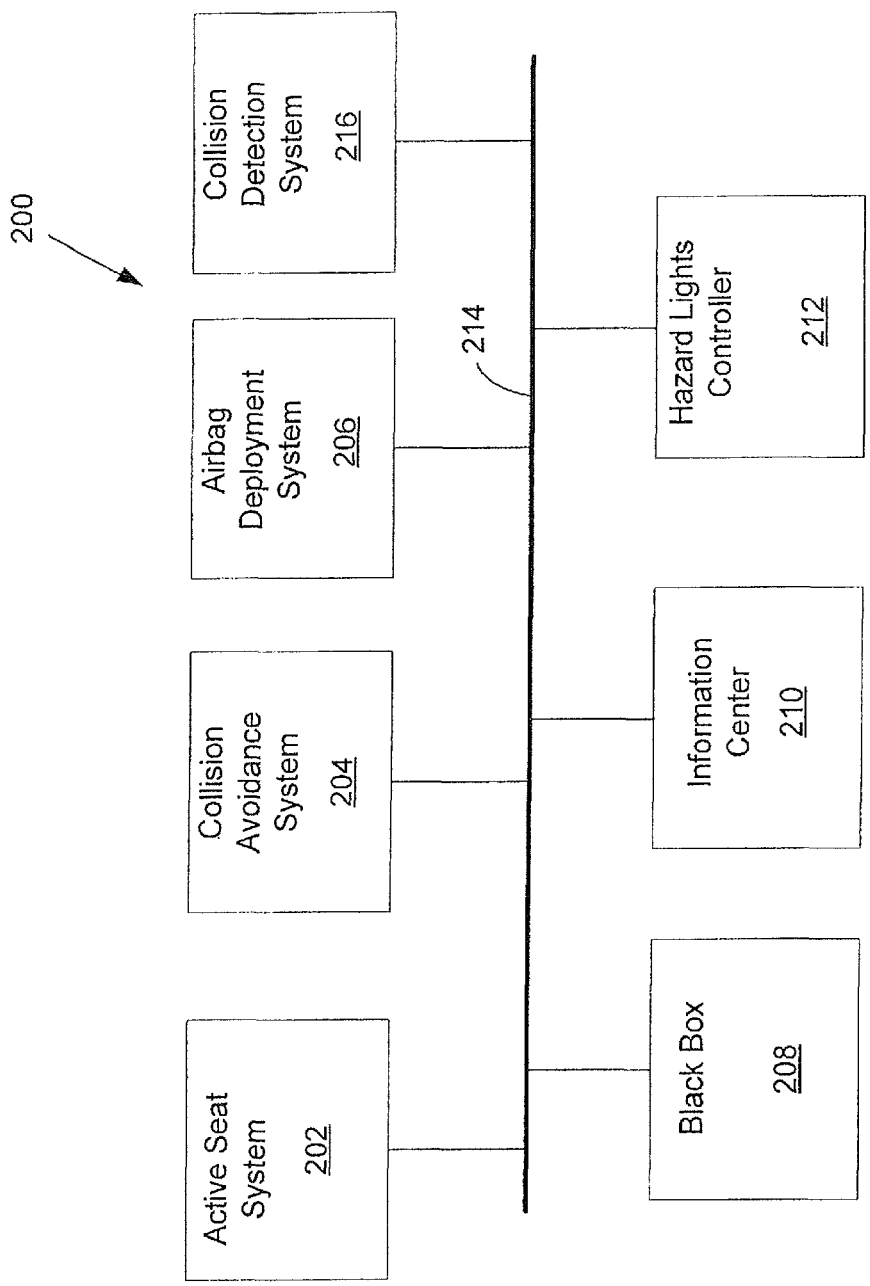
FIG. 8 is a block diagram of a motor vehicle network that includes the active seat.

Motor vehicle network 200, FIG. 8, comprises active seat 202 that is in data communication with existing motor vehicle systems such as collision avoidance system 204, airbag deployment system 206, black box 208, information center 210, hazard lights 212 and collision detection system 216. One or more of such systems communicates with one or more other such systems over existing vehicle data network 214, which typically uses an existing networking convention such as the controller area network (CAN) vehicle bus standard or the local interconnect network (LIN), general purpose input/outputs (GPM) or other existing motor vehicle communication standards as are known in the art.

In one exemplary use of network 200, in response to detecting an imminent frontal impact crash, the collision avoidance system 204 communicates such a status to the active seat system 202 via vehicle network 214. In response to the received status, the active seat system could move the seat up from the pre-status vertical position so as to provide greater range of controlled downward motion after the crash before the seat may reach the bottom limit of vertical mechanical travel. Another benefit of moving the seat up before an imminent frontal impact crash is that there is less seat belt restraint system webbing out of the spool and that reduces the amount of webbing stretch that contributes to frontal excursion of the occupant towards the steering wheel.

In a frontal impact crash, once the active seat motor is controlled to reach the optimal vertical position (e.g., all the way up), a MR damper could be turned on to further resist any downward motion, as described above.

In one example, in response to detecting an imminent rollover crash, the collision avoidance system 204 communicates such a status to the active seat system 202 via vehicle network 214. In response to the received status, the active seat is proactively pulled down, as described above. In response to determination that a crash condition is imminent but has not yet occurred, normal function of the seat is discontinued and the seat is moved to a position better suited to protection of the seat occupant: in case of a frontal impact, the seat is moved upwards prior to the crash while in case of a rollover, the seat is moved down. In case of a side impact, the seat is moved away from the side about to be impacted.

In a roll-over crash, an MR damper could be controlled off initially, or set to a minimum damping state, while the active seat motor is pulling the seat down to the bottom limit of vertical mechanical travel. Once that limit has been reached, the MR damper could then be turned on (e.g., with maximum damping coefficient), so as to resist any upwards vertical travel that could be caused by the occupant's weight.

In a roll-over crash or side collision crash and with an active seat having two degrees of translational freedom, for example vertical and horizontal lateral (i.e., z and y axes), it is advantageous to move the seat occupant away from the side of collision. For example, in roll-over crash the active seat would be pulled down and also pushed away from side of vehicle that is moving toward the earth. In a side collision crash, the active seat would be held in the vertical position while also using the lateral horizontal active isolation to move the occupant away from the side of collision. In a frontal collision, the horizontal active y-axis isolation would be locked/clamped/force applied to attempt to maintain a fixed nominal central position.

In one example, where the collision detection system 216 or an inertial sensor or another motion and/or force sensor is mounted in the trailer and/or in the trailer/cab coupling of a tractor trailer that has a separate cab, it is possible that an imminent tipping of the trailer could be detected based on a rolling motion greater than a threshold rolling motion. The sensor(s) would be in communication with the active seat controller. The detection could take place prior to the rollover of the cab that the occupant is in. In such a case, proactive positioning of the occupant can be achieved using the active seat to move the occupant towards an optimal position away from the roll-over side and pulling the seat downwards. Also, the imminent rollover could be reported and could potentially be counteracted.

In one example, where the collision includes a multitude of impacts and/or rolls, the active seat system 202 may sense and then communicate such information to an airbag deployment system 206 so as to sequence the deployments of airbags surrounding the occupant in a manner that provides maximum protection to the side of impact. For example, when a truck rolls to the left, then onto the roof, then again to the left (and so onto the right side), the airbag deployed sequence may be to deploy left-side airbag, then right-side airbag. The deployment can be timed relative to the rolling so that the airbag inflation occurs when the occupant is being thrown to the side where the airbag is being inflated. This can be done in addition to actuated seat motions as described above.

In one example, the active seat system 202 may indicate the detection of a collision to a hazard light controller 212 so that hazard lights can be turned on.

In one example, the active seat system 202 may indicate the detection of a collision to a black box 208 for logging of data, as a failsafe trigger to the self-monitoring by the black box and to provide data regarding the seat movement of the occupant.

In one example, the active seat system 202 may indicate the detection of a collision to an information center 210 that can communicate with emergency services or dispatcher so that status of the occupant can be relayed. Information, such as acceleration, derived by the active seat system could also be sent that can be used to understand the severity of the collision and hence ensure appropriate response is provided by emergency services.

A number of implementations have been described. Nevertheless, it will be understood that additional modifications may be made without departing from the scope of the inventive concepts described herein, and, accordingly, other embodiments are within the scope of the following claims.

What is claimed is:

1. A method for controlling the operation of an active suspension system for a motor vehicle passenger seat, where the active suspension system comprises an actuator that is constructed and arranged to place force on the seat that can move the seat in a first degree of freedom and a control system that is responsive to a sensor system that detects motor vehicle accelerations in at least the first degree of freedom, where the sensor system comprises an accident detection system that detects motor vehicle accident conditions, where the control system provides control signals that cause the actuator to exert a force on the seat in the first degree of freedom, wherein in normal active suspension operation mode the actuator is controlled to output forces that reduce acceleration of the seat to achieve a desired resultant motion of the seat in the first degree of freedom, the method comprising:
in response to the detection of an accident condition, using the control system to operate the actuator in a crash performance mode where the actuator is controlled to output a force on the seat that can move the seat, where the force is output to achieve a desired resultant motion of the seat in the first degree of freedom that differs from the desired resultant motion when the active suspension system is operating in normal active suspension operation mode.

2. The method of claim 1 wherein the sensors used for accident detection sense vehicle motion.

3. The method of claim 1 wherein the sensors used for accident detection sense vehicle surroundings.

4. The method of claim 3 wherein the sensors used for accident detection are electromagnetic.

5. The method of claim 3 wherein the sensors used for accident detection are optical.

6. The method of claim 1 wherein the active suspension system further comprises a damper with a variable damping coefficient, where the damper is constructed and arranged to apply a variable resistive force that opposes relative motion of the seating surface of the seat with respect to the seat base, wherein in the normal active suspension operation mode the damper is controlled to have a relatively low damping coefficient, and wherein in crash performance mode the damper is controlled to have a greater damping coefficient.

7. The method of claim 6 wherein the sensor system comprises an inertial sensor that senses motions of the seat and a non-inertial sensor that senses motions of the seat and the controller that commands the variable damper outputs control signals based only on the non-inertial sensor and not the inertial sensor when the system is operating in crash performance mode.

8. The method of claim 1 further comprising detecting, based on the sensor system, an imminent rollover of the motor vehicle and in response to the detection of an imminent rollover using the control system to provide control signals that cause the actuator to exert a force on the seat that can move the seat towards the vehicle floor, prior to the rollover occurring.

9. The method of claim 1 further comprising detecting, based on the sensor system, an imminent accident and in response to the detection of an imminent accident using the control system to provide control signals that cause the actuator to exert an upward force on the seat that can move the seat upward, prior to the accident occurring.

10. A method for controlling the operation of an active suspension system for a motor vehicle passenger seat, where the active suspension system comprises an actuator that is constructed and arranged to place force on the seat that can move the seat in a first degree of freedom and a control system that is responsive to a sensor system that detects motor vehicle accelerations in at least the first degree of freedom and that comprises an accident detection system that detects motor vehicle accident conditions, where the sensor system comprises an inertial sensor that senses motions of the seat and a non-inertial sensor that senses motions of the seat, and where the control system provides control signals that cause the actuator to exert a force on the seat that can move the seat in the first degree of freedom, wherein in normal active suspension operation mode the actuator is controlled to output forces that reduce accelerations of the seat to achieve a desired resultant motion of the seat in the first degree of freedom, the method comprising:
wherein in the normal active suspension operation mode the control system is responsive to the inertial sensor, and in response to the detection of an accident condition, the control system becomes responsive only to the non-inertial sensor, and is not responsive to the inertial sensor, and where in response to the detection of an accident condition the control system operates the actuator in a crash performance mode where the actuator is controlled to output a force on the seat that can move the seat, where the force is output to achieve a desired resultant motion of the seat in the first degree of freedom that differs from the desired resultant motion when the active suspension system is operating in normal active suspension operation mode.

11. The method of claim 10 wherein in normal active suspension operation mode the control system is responsive to both the inertial sensor and the non-inertial sensor.

12. A method for controlling the operation of an active suspension system for a motor vehicle passenger seat, where the active suspension system comprises an actuator that is constructed and arranged to place force on the seat that can move the seat in a first degree of freedom and a control system that is responsive to a sensor system that detects motor vehicle accelerations in at least the first degree of freedom and that comprises a system that detects one or more of a motor vehicle accident and an imminent accident, wherein the sensor system comprises at least one sensor that is part of the active suspension system, where the sensor is constructed and arranged to transmit sensor signals to the control system, and where the control system provides control signals that cause the actuator to exert a force on the seat that can move the seat in the first degree of freedom, wherein in normal active suspension operation mode the actuator is controlled to output forces that reduce accelerations of the seat, and where the motor vehicle has a vehicle data network that communicatively interconnects the active suspension system with a different motor vehicle system, the method comprising:
in response to the detection of an accident or an imminent accident, using the control system to operate the actuator to place force on the seat that can move the seat in the first degree of freedom and communicating over the network to the different motor vehicle system a signal that is related to the accident or imminent accident.

13. A method for controlling the operation of an active suspension system for a motor vehicle passenger seat, where the active suspension system comprises an actuator that is constructed and arranged to place force on the seat that can move the seat in a first degree of freedom, a damper with a variable damping coefficient, where the damper is constructed and arranged to a apply a variable resistive force that opposes relative motion of the seating surface of the seat with respect to the seat base, and a spring with a variable spring constant, where the spring is constructed and arranged to place force on the seat in the first degree of freedom, and a control system that is responsive to a sensor system that detects motor vehicle accelerations in at least the first degree of freedom, where the sensor system comprises an accident detection system that detects motor vehicle accident conditions, where the control system provides control signals that cause the actuator to exert a force on the seat that can move the seat in the first degree of freedom, wherein in normal active suspension operation mode the actuator is controlled to output forces that reduce acceleration of the seat so as to counteract motions of the seat in the first degree of freedom, the method comprising:

detecting, based on the sensor system, a rollover of the motor vehicle and in response to the detection of a rollover using the control system to provide control signals that cause the actuator to exert a maximum force on the seat that can move the seat towards the vehicle floor, cause the spring constant of the spring to quickly decrease, and cause the damping coefficient of the damper to be relatively low.

14. The method of claim 13 wherein, in response to the detection of a rollover, after the seat is moved towards the vehicle floor by the actuator the control system is used to operate the actuator to output a force on the seat that can move the seat, where the force is proportional to the velocity of the seat in the first degree of freedom.

* * * * *